(12) United States Patent
Brown et al.

(10) Patent No.: US 7,490,060 B2
(45) Date of Patent: Feb. 10, 2009

(54) SYSTEM AND METHOD FOR MODELING MARKET STRUCTURES AND PROCESSING MARKET STRUCTURE TRANSACTIONS OVER AN ELECTRONIC NETWORK

(75) Inventors: Stephen Brown, Berkeley, CA (US); Angela Chen, Sunnyvale, CA (US); Thomas N. DeSouza, Mountain View, CA (US)

(73) Assignee: IT&e Limited (AU)

( * ) Notice: Subject to any disclaimer, the term of this patent is extended or adjusted under 35 U.S.C. 154(b) by 1438 days.

(21) Appl. No.: 09/946,742

(22) Filed: Sep. 4, 2001

(65) Prior Publication Data
US 2002/0065766 A1    May 30, 2002

Related U.S. Application Data

(60) Provisional application No. 60/230,079, filed on Sep. 5, 2000.

(51) Int. Cl.
*G06Q 40/00* (2006.01)

(52) U.S. Cl. ....................................................... 705/37
(58) Field of Classification Search ...................... None
See application file for complete search history.

(56) References Cited

U.S. PATENT DOCUMENTS 6,131,087 A * 10/2000 Luke et al. .................... 705/26

* cited by examiner

*Primary Examiner*—Hani M. Kazimi
*Assistant Examiner*—Olabode Akintola
(74) *Attorney, Agent, or Firm*—Sheppard Mullin Richter & Hampton LLP

(57) ABSTRACT

A system for processing transaction data associated with a market transaction is provided that includes a pre-processor module configured to receive transaction data and to create objects associated with the transaction data, a marketspace module connected to the pre-processor module and configured to hold the objects, and an execution engine connected to the marketspace module and configured to retrieve the objects from the marketspace module and to match at least one object to at least another object (based upon the pluggable algorithm).

28 Claims, 5 Drawing Sheets

SYSTEM AND METHOD FOR MODELING MARKET STRUCTURES AND PROCESSING MARKET STRUCTURE TRANSACTIONS OVER AN ELECTRONIC NETWORK

CROSS-REFERENCE TO RELATED APPLICATION

This application claims priority from U.S. provisional patent application Ser. No. 60/230,079, filed on Sep. 5, 2000, which is herein incorporated by reference for all purposes.

FIELD OF THE INVENTION

The present invention relates generally to electronic commerce and more particularly to a system and method for modeling market structures and processing market structure transactions over an electronic network.

BACKGROUND OF THE INVENTION

A market can be viewed as a set of economic considerations, relationships, participants and constraints that come together to form and define a market structure. Economic considerations might include value (often the price when dealing with goods and services), supply and demand, competition, etc. Relationships might include agreements or arrangements amongst businesses, companies, trading partners, OEMs, distributors, resellers, etc. Participants might include buyers, sellers, brokers, etc. Constraints might include regulatory frameworks, trading conditions, barriers to entry, etc.

Markets form for many different reasons and the advent of the Internet has provided the basis for the development of existing market structures and the introduction of new market structures. There are many different types of markets (i.e., market structures) that currently exist. Examples of some of the most common market structures are discussed below.

Fixed Bid Market Structure

A fixed bid market structure is based on a posted-price economic structure. In a fixed bid market structure, the list or transaction price is always the seller's price. Typically, there is no negotiation of the seller's prices, but the seller might offer the buyer volume discounts. One example of a fixed bid market structure is a grocery store. In a grocery store, rival grocery sellers post prices and sell to consumer buyers through face to face communication (or even over network communication such as Web-based grocery sellers www.webvan.com). Hence, the consumer buyers are bound by the seller's prices.

English Auction Market Structure

An English auction is the most common type of ascending-bid auction. In an English auction, the auction begins with the lowest acceptable price (a reserve price) and proceeds with successively higher bids until no buyer will increase their bid. The transaction price is the highest bid price.

Dutch Auction Market Structure

A Dutch auction is the most common type of descending-bid auction. In a Dutch auction, the auction begins at an extremely high price and is progressively lowered until a buyer claims an item. The transaction price is the lowest bid price.

Sealed Bid Auction Market Structure

One type of sealed bid auction is a first-price sealed bid auction. In a first-price sealed bid auction, buyers submit sealed bids for items that are offered by a seller. Each bidder submits a bid with no knowledge of the other bids. The transaction price is the winning buyer's bid. In a first-price auction with more than one unit of the product up for sale, the sealed bids are sorted from highest to lowest and winning bidders often pay different prices for each unit of the product. Another type of sealed bid auction is a Vickrey sealed bid auction. In a Vickrey sealed bid auction, the bids are sealed but the item is awarded to the highest bidder at a price equal to the second highest bid. If multiple units are for sale, all winning bidders pay for the items at the same price, namely the highest closing price (or second highest bid).

Reverse Auction Market Structure

A reverse auction market structure is the most common type of seller-driven auction. In a reverse auction, sellers submit successively descending offers until no one is willing to reduce their price any further. The transaction is settled at the lowest seller's offer price.

Call Auction Market Structure

In a call auction market structure, there is one seller and multiple buyers competing to purchase a fixed supply of goods. The call auction is typically used for selling treasury bonds. The bids are accumulated during the call period and are sorted from highest to lowest at the end of the call period. The bonds are then awarded to bidders starting at the highest bid price and moving down until all the bids are exhausted.

Double Continuous Exchange Market Structure

The double continuous exchange market structure has been the principal trading format in U.S. financial institutions for over a hundred years. In this market structure, buyers submit bids and sellers submit offers that are ranked highest to lowest to generate buy and sell queues. From the queues, the maximum quantity traded can be determined by matching sellers' offers (starting with the lowest offer and moving up) with buyers' bids (starting with the highest price and moving down). Matches occur when the buy queue and the sell queue overlap.

Call Market Exchange Market Structure

Bids from buyers (i.e., buy bids) and offers from sellers (i.e., sell offers) are accumulated during a predefined call period and optimally matched at the end of the call period. A call market exchange is used in a variety of markets in which buy and sell orders are collected over a period of time for batch rather than continuous execution. The New York, Tokyo, Paris, and Frankfurt stock exchanges use call market exchanges everyday to establish the opening price for each stock. After the opening, subsequent trading is performed using a double continuous exchange market structure.

Other Market Structures

There are many other market structures and the examples discussed above are designed to be an overview of some of the more common market structures currently in existence. In addition to different types of market structures, there are also numerous facets complementary and/or intrinsic to market structures which enable auctions, exchanges and other market structures to operate in a more optimistic manner by meeting the requirements of specific market structures. Examples of such facets include proxy bidding, contingency bidding, bundling/unbundling bidding, and budget management bidding.

Proxy bidding is an auction monitoring tool that enables one to participate in an auction without being present. For a given auction, the bidder may specify a maximum (or minimum depending on the format) bid (and possibly a bid increment) for a product or service. As the auction progresses, the proxy bids on the bidder's behalf, and each time the bidder is outbid, the proxy submits a new bid (at the specified bid increment). This process continues until the bidder wins or the specified maximum/minimum bid amount is met.

Contingency bidding is the ability to control a buying or selling decision based on another buying or selling event or rule. Contingency bids can apply across multiple exchanges or auctions, and any set of decisions that occur during the trading process. An example of a contingency bid would be: If the market participant buys 100 shares of IBM stock at $125 or better then sell 100 shares of this market participant's GE stock at market price.

Bundling/Unbundling bidding is the ability to break apart or combine offerings or purchases usually to achieve greater efficiencies. A basic form of the functionality is outlined in the Weights and Variances for product metrics. A user should specify whether they will accept partial quantities and what is the minimum quantity they will accept and any multiples thereof. For example, a market participant may place an order to buy 500 shares of IBM stock at $116, allow partial orders of 200 shares and a minimum lot size of 100. Therefore, depending on market conditions, the buyer may purchase 200, 300, 400 or 500 shares of IBM. Another example of bundling bidding is basket trades or trades where a portfolio of different holdings are traded as a single package.

Budget management bidding is a trading tool that gives the user the ability to specify a maximum spending limit, but allows for the system to solve for the optimum decision. For example, assume a traveler had $1,000 to spend on a four day vacation in San Francisco and the traveler needs airfare, hotel accommodations and a rental car. The system would search for hotels, airfare and rental cars and then present vacation packages within the specified budget. An example of a budget management bidding system is www.priceline.com.

Today's market structures are often implemented over communications networks, thereby creating electronic marketplaces. Indeed, the advent of the Internet has provided a standard business communication channel platform for electronic marketplaces; however, current electronic marketplaces (including Internet-based electronic marketplaces) still suffer from limited capabilities and functionality. For example, current electronic marketplaces are limited in their ability to support complex market formation requirements. Websites such as www.ewanted.com and www.iwant.com are examples of buyer-driven systems in which buyers are trying to locate sellers. Websites such as www.ebay.com and www.auctions.yahoo.com are examples of seller-driven systems in which sellers are trying to locate buyers. These and other currently existing Internet-based electronic marketplaces are limited to being able to handle only a limited number of different market structures. For example, the auction sites listed above are only able to handle auction formats (not any other types of market structures such as exchanges) and in addition, are limited in the sense that each auction site can only handle certain types of auctions (e.g., buyer driven or seller driven, ascending or descending, etc.).

One problem with current electronic marketplaces is the fact that such systems are hard-wired and limited in the sense that they are designed to only handle certain market structures or certain facets of market structures but cannot be enhanced or expanded to deal with additional market structures or advanced facets of market structures. Also, current electronic marketplaces lack inter-connectivity. For example, financial markets use an electronic communication network (ECN) model for connectivity between markets. ECN provides the interconnecting of pools of liquidity between markets; however, it is currently difficult to extend the functionality of ECNs and therefore, inter-connectivity of financial markets is limited. While the Internet has provided the platform to enable electronic marketplaces to handle large amounts of liquidity, current systems are not designed to properly utilize the Internet to handle large amounts of liquidity.

It should therefore be appreciated that there is a need for a highly scalable, fault-tolerant electronic marketplace system that can support many different market structures (including the facets associated with more complex market structures), support complex market formation requirements, and allow for easy interconnectivity between markets. The present invention fulfills this need as well as others.

SUMMARY OF THE INVENTION

The present invention is directed to a system and method for modeling market structures and processing market structure transactions over an electronic network. The present invention models market structures using dimensional parameters (of which 6 are presently identified); uses a high performance, highly scalable, fault tolerant structure to process transactions associated with any of these market structures; and is capable of processing transactions for market structures involving different trading strategies, complex matching requirements and the various facets associated with complex market structures. The present invention separates data structures and matching algorithms from the exchange platform to readily support complex business requirements. The present invention is based upon loosely coupled, massively concurrent processing and separates itself from the data objects and matching algorithms that make up a marketplace.

The present invention is directed to a system for processing transaction data associated with a market transaction that includes a pre-processor module configured to receive transaction data and to create objects associated with the transaction data, a marketspace module connected to the pre-processor module and configured to hold the objects, and an execution engine connected to the marketspace module and configured to retrieve the objects from the marketspace module and to match at least one object to at least another object (based upon the pluggable algorithm).

The present invention is also directed to a system having a pre-processor module, a marketspace module, and an execution engine, and a method of modeling a market structure which includes receiving a bid object having phase data, complexity data, sequencing data, allowance data, transparency data, and transaction value data, identifying the complexity data as either 1×N, N×1 or N×N, identifying the phase data as either continuous or discrete, identifying the sequencing data as either ascending, descending or random, identifying the allowance data as either single or multiple, identifying the transparency data as either open or closed, and identifying the transaction value data as either bidder or clearing.

Advantages of the present invention include providing a system that can process transactions for any auction, exchange or other market structure, and can easily interconnect markets. In addition, the present invention provides low-cost scalability of any part of the system for more focused, efficient, and cost effective duplicating of any part of the system whenever capacity is reached. The result is a distribution of computation across multiple processors, each of which have a smaller footprint than would an equivalent set of central applications. Another advantage of the present invention includes increased fault tolerance and greater reliability through use of a loosely-coupled design where if one component is nonfunctioning, another instantiation is used and the processing of the transactions is redirected accordingly.

Other features and advantages of the present invention should become apparent from the following description of the preferred embodiment, taken in conjunction with the accompanying drawings, which illustrate, by way of example, the principles of the present invention.

DETAILED DESCRIPTION OF THE PREFERRED EMBODIMENT

Figure 1:
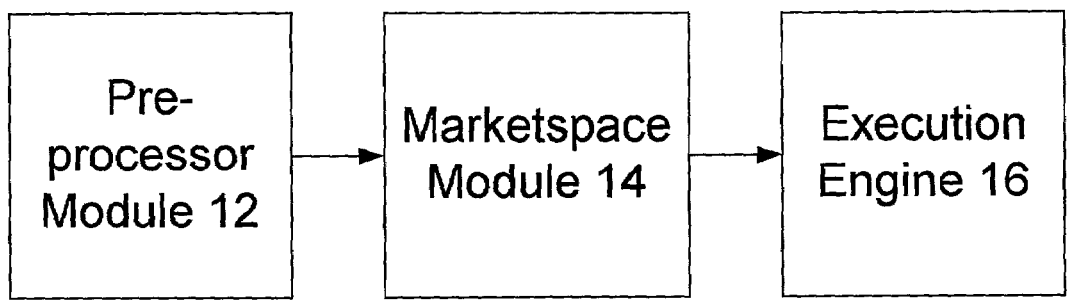
FIG. 1 is a simplified block diagram of a system architecture having a preprocessor module, a marketspace module, and an execution engine.

In this description, the present invention is described in detail with regard to the drawing figures briefly described above. With reference to FIG. 1, there is shown a simplified block diagram of a system architecture 10 having a preprocessor module 12, a marketspace module 14, and an execution engine 16. Even though only one pre-processing module, one marketspace module, and one execution engine are shown, the system architecture is configured and designed to have additional pre-processor modules, marketspaces modules, and execution engines. The pre-processor module and execution engine interact indirectly through the marketspace module to model market structures and process market structure transactions for the market structures. The pre-processor module, marketspace module, and execution engine are linked together through any appropriate transport protocol. For example, if the system architecture is designed to operate within a single enterprise, then internetwork packet exchange (IPX) may be used as a transport protocol to link the three components. Also, if the system architecture is designed to be used across the Internet, then TCP/IP may be used as a transport protocol to link the three components.

The system architecture 10 provides for dynamic configuration in that when an additional component is connected, the system detects the additional component and automatically configures the component to integrate with the rest of the system architecture. The result is a distribution of computation across multiple components, e.g., pre-processing modules 12 (distributed computing). Distributed computing allows applications to share and modify data structures in a coordinated way and inherently provides for system scalability, fault tolerance, and self-healing. Through the use of distributed computing principles, objects can be received by the marketspace module 14 without any concern about which execution engine 16 will retrieve the object for processing.

One way of implementing the system architecture to provide for distributed processing across multiple pre-processor modules, marketspace modules, and/or execution engines is through use of Jini technology developed and offered by Sun Microsystems. Jini technology seeks to simplify the connection and sharing of devices, such as printers and disk drives, on a network. Currently, adding devices such as printers and disk drives to a computer or network requires installation and boot-up, but a device that incorporates Jini technology will announce itself to the network, provide some details about its capabilities, and immediately become accessible to other devices on the network. Using Jini technology, it is possible to create distributed computing such that capabilities are shared among the systems on a common network. Jini technology is one way of implementing the system architecture to provide for distributed processing. One of ordinary skill in the art will know of many different ways to implement the system to provide for distributed processing across multiple components.

The present invention uses a number of categories or dimensions to model market structures and process market structure transaction data associated with the market structures. The initial modeling utilizes six such dimensions as follows:

(i) Phase: The phase is the measurement of time elapsed during the bidding process and can be either continuous or discrete. The market structure's phase is continuous if bids are matched and awarded constantly (i.e., continuously). The market structure's phase is discrete if all bids are submitted during one time period and are not processed until after the time period ends. Examples of continuous phase market structures include double continuous exchange and fixed bid. Examples of discrete phase market structures include sealed bid auction, Vickrey sealed bid auction, call auction, and call market exchange.

(ii) Complexity: The complexity refers to the number of sides (buyers or sellers) submitting bids. The market structure is of N×1 complexity if only buyers are bidding on the offered items/services. The market structure is of 1×N complexity if only sellers are making offers for items/services. The market structure is of N×N complexity if both buyers and sellers are bidding on the offered items/services. Examples of N×1 market structures include English auction, Dutch Auction, Vickrey sealed bid auction, silent auction, and fixed bid. Examples of 1×N market structures include reverse auction and sealed bid auction. Examples of N×N market structures include double continuous exchange and call market exchange.

(iii) Sequencing: Sequencing refers to the relative value of each successive bid. A market structure has ascending sequencing if a successive bid can only be submitted if it is higher than the previous bid submitted. A market structure has descending sequencing if a successive bid can only be submitted if it is lower than the previous bid submitted. A market structure has random sequencing if successive bids can be submitted without regard to the price of the previous bid submitted. English and silent auctions are examples of ascending sequencing. Reverse and Dutch auctions are examples of descending sequencing. Sealed bid auction, Vickrey sealed bid auction, double continuous exchange, fixed bid, call auction, and call market exchange are examples of random sequencing.

(iv) Allowance: Allowance refers to the amount of bids one can submit per item. A market structure gives single allowances if one entity can submit only one bid per item (i.e., only one chance to bid for an item). A market structure supports multiple allowances if one entity can submit multiple bids per item (i.e., resubmit a better bid if outbid by another entity). Sealed bid auction, Vickrey sealed bid auction, and fixed bid are examples of market structures having single allowances. English auction, Dutch auction, double continuous exchange, silent auction, call auction, and call market exchange are examples of market structures having multiple allowances.

(v) Transparency: Transparency refers to the knowledge of others' valuation when bidding. The market structure yields open transparency if all bids can be viewed by all participating entities. The market structure yields closed transparency if no bids can be viewed by any entity other than those who submitted the bids. Examples of open transparency market structures include English auction, Dutch auction, double continuous exchange, silent auction, and fixed bid. Examples of closed transparency market structures include sealed bid and Vickrey sealed bid auction.

(vi) Transaction Value: Transaction Value refers to the amount a buyer pays for an item bid upon. The transaction value can be the bidder's transaction price (i.e., the price the winning bidder bid on the item) such as in an English auction, Dutch auction, sealed bid auction, double continuous exchange, and silent auction market structures or a clearing transaction price (i.e., the amount determined by that particular auction) as in the case of a Vickrey sealed bid auction or fixed bid auction market structure.

The present invention introduces a new and robust method for modeling market structures and handling the processing of the transaction data associated with any one of hundreds of possible market structures. The six dimensions identified above are used to model market structures. In addition to modeling and processing market transactions for hundreds of market structures, the present invention can also accommodate the facets complementary and/or intrinsic to market structures which can enable auctions, exchanges and other market structures to operate in a more optimistic manner by meeting the requirements of specific market structures.

The components used to model the market structure are discussed in detail below. The components may be implemented using hardware and/or software.

Pre-Processing Module

The pre-processing module 12 includes a pre-processor that receives and/or stores transaction data from a source, validates the data, and creates objects (or data structures) from the data. The pre-processor also processes the transaction data, marshals the transaction data, and routes the objects to the marketspace module 14. The pre-processor can also route the objects to one or more marketspace modules. One of ordinary skill in the art will know of several different ways to implement a routing mechanism. Further, it is also possible to use an abstraction model which supports multiple routing mechanisms.

The source may be any type of graphical user interface (GUI) or application whereby a user (or other software application) can submit transaction data, which might include data corresponding to the six dimensions and trading instructions. Examples of trading instructions include whether the specific bid is an offer bid or buy bid, value of the bid (price and quantity), any special instructions such as a reserve price, item ID (so the bid can be associated with a particular item), expiration time (if phase dimension is specified as discrete), and timestamp for the bid (might be used for some matching algorithms that sort bids at the execution engine). In addition, the transaction data might also include a unique object ID that is assigned to each object. The object ID might be assigned by the pre-processor or might be received from the source with the other transaction data.

For example, for an English auction market structure, the transaction data received from the GUI or application might be data corresponding to the six dimensions such as discrete phase, N×1 complexity, ascending sequencing, single allowance, open transparency, and bidder's transaction value; and trading instructions such as Is Buy Bid/Offer Bid: Buy; Value of Bid: $5, 1; Special Instructions: IF bid 2420965 THEN cancel bid 9930264; item ID: 23456; Expiration time: 100800.15.00.23 (Aug. 10, 2000 at 3:00:23 pm); Timestamp: 100800.12.34.25; and object ID: 9930264.

Once the transaction data is marshaled by the pre-processing module 12, the pre-processor ensures that values for the data are allowable (or valid). The set of validations can be dynamically loaded from a directory server (such as LDAP). An object, e.g., bid object, is then created from the transaction data, where the object is essentially a data structure in which the data is encapsulated in a form so that it may be processed by the execution engine 16.

Marketspace Module

The marketspace module 14 is a database that holds or stores the objects. The marketspace module is based on the tuple-space concept developed by university research, and is implemented as a JavaSpace (an implementation of tuple-spaces by Sun Microsystems). One of ordinary skill in the art will know other ways of implementing the functionality of the marketspace module.

The pre-processor module 12 and execution engine 16 communicate with one another by exchanging objects through the marketspace module 14. There are many advantages of a design that incorporates the use of a tuple-space based marketspace module. For example, the marketspace module is persistent in that the objects stored in the marketspace module can outlive the processes that created the object. In addition, the marketspace module is transactionally secure in that there is an assurance that the operation on the object stored in the marketspace module is atomic (either the operation is applied or it is not). Therefore, at any given time in the system, each data structure will exist only once within the system. In addition, any modifications to a data structure can only be acted upon by one entity at any time. This resolves concurrency issues that may otherwise occur. The objects remain in the marketspace module until retrieved for execution by the execution engine.

Execution Engine

Figure 2:
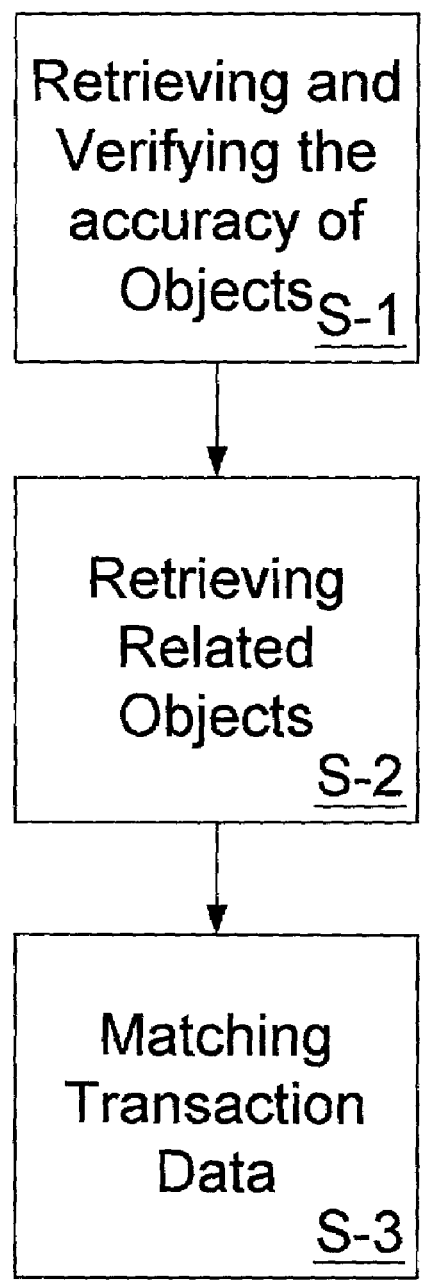
FIG. 2 is a simplified flow chart illustrating the three functions executed by the execution engine.

FIG. 2 is a simplified flow chart illustrating the three functions executed by the execution engine 16. The execution engine is responsible for retrieving and verifying the accuracy of objects received from the marketspace module 14 (the Test Phase) (step S-1); retrieving related objects from the marketspace module (the Create Phase) (step S-2); and running a matching algorithm and executing the transaction data (for example, by writing the transaction outcomes to the database) (the Match Phase) (step S-3). That is, the execution engine is responsible for matching transaction data (i.e., matching buy and sell objects) and recording transaction outcomes (step S-3).

Figure 3:
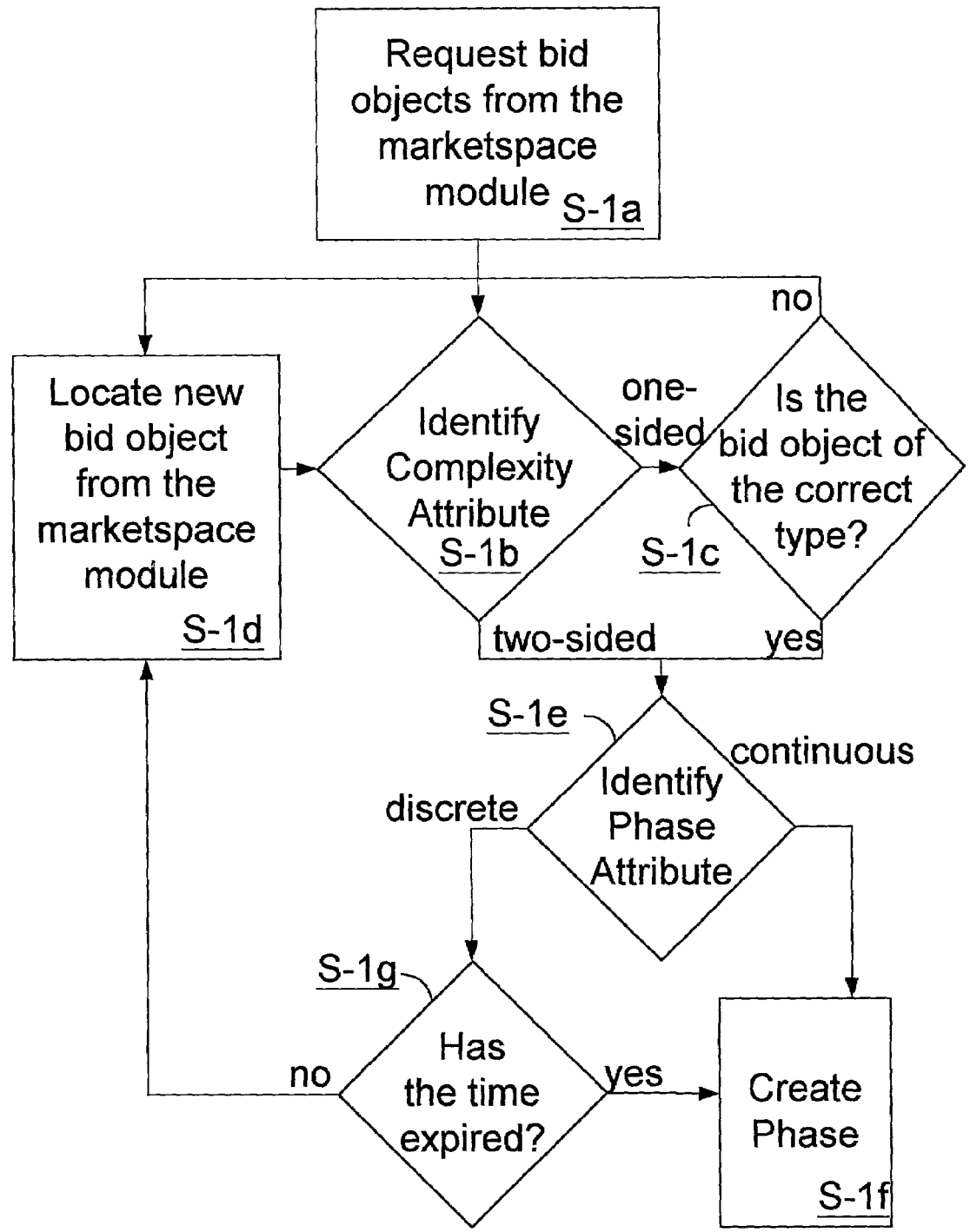
FIG. 3 is a flow chart illustrating the functions of the execution engine during the Test Phase.
Figure 4:
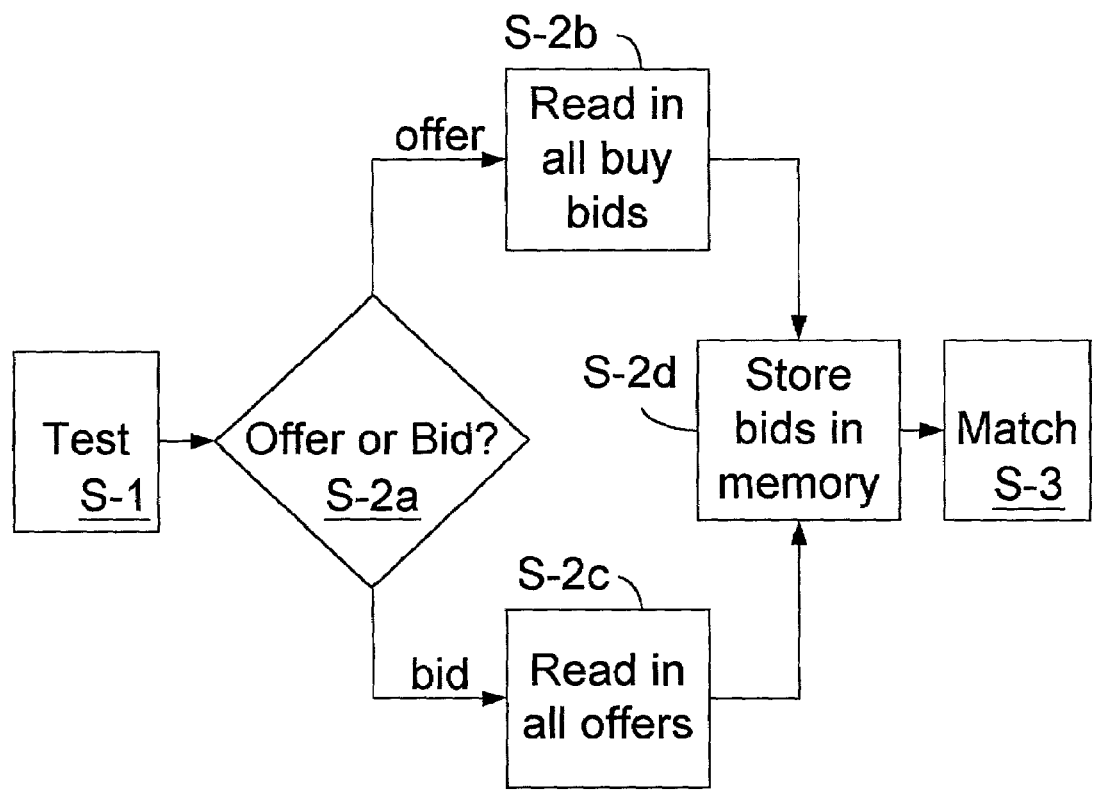
FIG. 4 is a flow chart illustrating the functions of the execution engine during the Create Phase.
Figure 5:
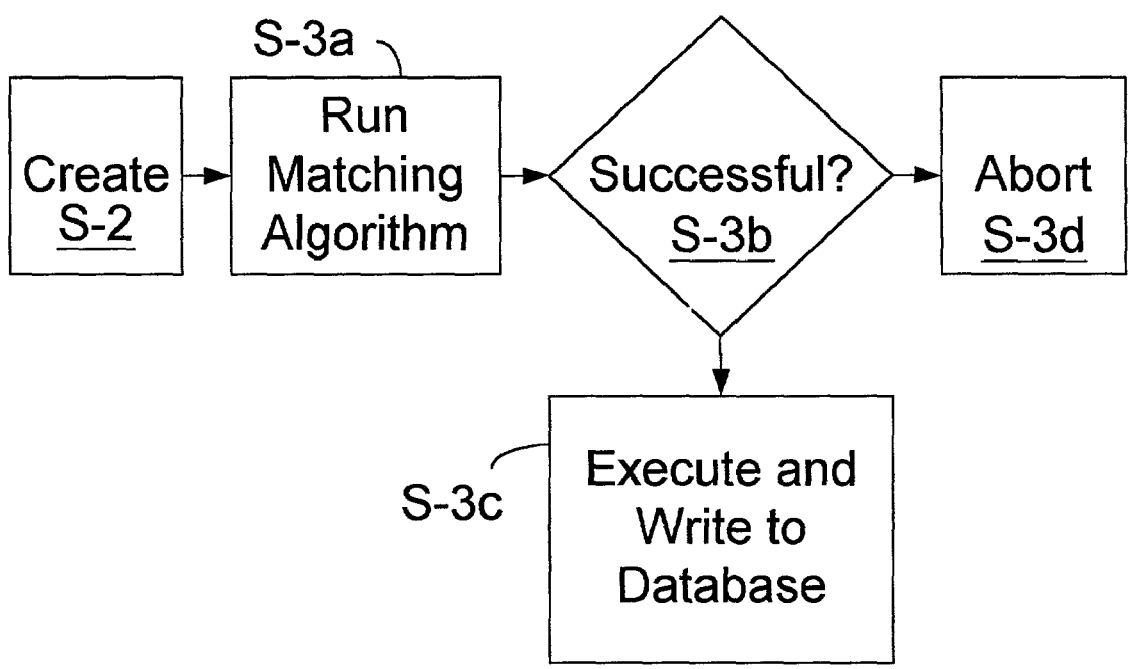
FIG. 5 is a flow chart illustrating the functions of the execution engine during the Match Phase.

FIGS. 3-5 are simplified flow charts illustrating the functions of the execution engine. The flow charts illustrate an example of one implementation of the functions of the execution engine. One of ordinary skill in the art will understand that there are several ways of implementing the execution engine.

FIG. 3 is a flow chart illustrating the functions of the execution engine 16 during the Test Phase. The Test Phase begins at step S-1a when the execution engine pulls, requests or retrieves bid objects from the marketspace module 14. This operation can be executed in many different ways by the execution engine. For example, the execution engine can constantly poll the marketspace module to determine when a bid object is available or the marketspace module can be configured to notify the execution engine when a bid object arrives into the marketspace module.

When an execution engine is created, it loads the proper matching algorithm from an internet directory server (i.e., LDAP). If the particular bid object contains the set of 6 dimensions, at step S-1b, the execution engine identifies the complexity attribute of the bid object, which entails determining if the bid object is one-sided or two-sided. If the bid object is one-sided then the execution engine determines if it is associated with a buyer or a seller. If the bid object is associated with either a buyer or seller, then at step S-1c, the execution engine determines whether the bid object is of the correct type. That is, if the bid object is associated with a buyer in a N×1 (number of buyers x number of sellers) relationship then the bid object is transmitted back to the marketspace module 14 and a new bid object is pulled from the marketspace module (step S-1d). If the bid object is associated with a buyer in a 1×N relationship then the bid object is correct and is accepted. If the bid object is associated with a seller in an N×1 relationship then the bid object is accepted. If the bid object is associated with a seller in a 1×N relationship then the bid object is transmitted back to the marketspace module and a new bid object is pulled from the marketspace module (step S-1d).

After it is determined that the object is of the right type (or that the object has a two-sided N×N complexity), at step S-1e, the execution engine 16 identifies the phase attribute of the bid object. If the phase attribute is continuous then the next step is to go to the Create Phase (step S-1f). If the phase attribute is discrete then the execution engine determines whether the time has expired (step S-1g). If the time has expired, then the next step is to go to the Create Phase (step S-1f). Otherwise, if the time has not expired, the bid object is transmitted back to the marketspace module and a new object is pulled from the marketspace module (step S-1d).

FIG. 4 is a flow chart illustrating the functions of the execution engine 16 during the Create Phase. The Create Phase begins at step S-2a by the execution engine determining whether the bid is a seller bid (i.e., offer) or a buyer bid (i.e., bid). If the bid is a seller bid, the market structure is N×1 and the execution engine reads in all associated buy bids from the marketspace module 14 (step S-2b). If the bid is a buyer bid, the market structure is 1×N and the execution engine reads in all associated sell bids from the marketspace module (step S-2c). After all the bids are read in, the bids are stored in memory or in a data structure, e.g., an array, that is part of or connected to the execution engine (step S-2d).

FIG. 5 is a flow chart illustrating the functions of the execution engine 16 during the Match Phase. In the Match phase, a matching algorithm is run on the data retrieved or stored during the Create Phase (step S-3a). One of ordinary skill in the art will know that many different types of matching algorithms exist and the choice of which algorithm to use is often dependent on the type of market structure being used. For example, in an English auction, a basic matching algorithm would sort all buyer bids by time stamp, ensure that all bid values increase in value and then select the highest bid value as the winner. In a reverse auction, a basic matching algorithm would sort all seller bids by time stamp, ensure that all bid values decrease in value, and select the lowest bid value as the winner. In a double auction, a basic matching algorithm would sort all buy bids and sell bids by value, then if any two buy bids or sell bids have the same value, sort by time stamp, then match buy bids to sell bids and transact any that overlap.

One implementation of the present invention uses matching agents to help choose an appropriate matching algorithm for the bid object. Specifically, the execution engine 16 has access to several different matching algorithms for different types of market structures and matching agents are used to select a specific algorithm for a specific object. The matching agents are not tightly coupled to the matching algorithms but rather, are decoupled from the matching algorithms which allow matching agents to select different auction algorithms for different bid objects. At step S-3b, the matching algorithm determines whether a match has occurred. If a match is found, the transaction is executed and the outcome is recorded or stored in the database (step S-3c). If there is no match, then the process is aborted as there was no completed transaction (step S-3d).

The foregoing detailed description of the present invention is provided for the purposes of illustration and is not intended to be exhaustive or to limit the invention to the precise embodiment disclosed. Accordingly, the scope of the present invention is defined by the following claims.

What is claimed is:

1. A system for processing transaction data associated with a market transaction comprising:
 a pre-processor module configured to receive transaction data and to create objects associated with the transaction data;
 a marketspace module connected to the pre-processor module and configured to hold the objects; and
 an execution engine connected to the marketspace module and configured to retrieve the objects from the marketspace module and to match at least one object to at least another object,
 wherein the transaction data is selected from a group consisting of phase data, complexity data, sequencing data, allowance data, transparency data, transaction value data, object ID data, and trading instruction data.

2. A system as defined in claim 1 wherein the trading instruction data is selected from a group consisting of offer bid data, buy bid data, price bid data, quantity bid data, special data, item ID data, expiration data, and time data.

3. A system as defined in claim 1 wherein the pre-processor module is further configured to marshal the transaction data.

4. A system as defined in claim 3 wherein the pre-processor module is further configured to validate the transaction data after the transaction data is marshalled.

5. A system as defined in claim 1 wherein the pre-processor module is further configured to assign an object ID to the transaction data.

6. A system as defined in claim 1 wherein the pre-processor module is further configured to route the objects to the marketspace module.

7. A system as defined in claim 1 wherein each object is a data structure.

8. A system as defined in claim 1 wherein the pre-processor module, marketspace module, and execution engine are connected via internetwork packet exchange protocols.

9. A system as defined in claim 1 wherein the pre-processor module, marketspace module, and execution engine are connected via TCP/IP protocols.

10. A system as defined in claim 1 wherein the marketspace module is an implementation of a tuple-space.

11. A system as defined in claim 1 wherein the execution engine is configured to load a matching algorithm from an internet directory server.

12. A method of processing data associated with a market transaction comprising:
 receiving transaction data relating to the market transaction;
 creating bid objects from the transaction data;
 storing the bid objects in memory;
 retrieving the bid objects from memory; and executing a matching algorithm on the bid objects,
wherein the transaction data is selected from a group consisting of phase data, complexity data, sequencing data, allowance data, transparency data, transaction value data, object ID data, and trading instruction data.

13. A method as defined in claim 12 further comprising validating the transaction data.

14. In a system having a pre-processor module, a marketspace module, and a execution engine, a method of executing market transactions comprising:
receiving a bid object having phase data, complexity data, sequencing data, allowance data, transparency data, and transaction value data;
modeling a market structure associated with the bid object;
selecting a matching algorithm associated with the market structure;
executing said matching algorithm on the bid object; and
if a match is found, executing a corresponding transaction and storing a result thereof in a database,
wherein the step of modeling a market structure comprises:
identifying the complexity data as either 1×N, N×1 or N×N;
identifying the phase data as either continuous or discrete;
identifying the sequencing data as either ascending, descending or random;
identifying the allowance data as either single or multiple;
identifying the transparency data as either open or closed; and
identifying the transaction value data as either bidder or clearing.

15. A method as defined in claim 14 further comprising validating the transaction data.

16. A method as defined in claim 14 further comprising determining whether a timer has expired if the phase data is discrete.

17. A method as defined in claim 16 further comprising transmitting the bid object to the marketspace module and retrieving a new bid object from the marketspace module if the timer has not expired.

18. A method as defined in claim 14 further comprising determining whether the bid object is associated with a buyer or a seller.

19. A method as defined in claim 18 further comprising transmitting the bid object to the marketspace module and retrieving a new bid object from the marketspace module if the bid object is associated with the buyer and the complexity data is N×1.

20. A method as defined in claim 18 further comprising transmitting the bid object to the marketspace module and retrieving a new bid object from the marketspace module if the bid object is associated with the seller and the complexity data is 1×N.

21. A method as defined in claim 18 further comprising reading in all associated sell bids from the marketspace module if the bid object is associated with the buyer.

22. A method as defined in claim 18 further comprising reading in all associated buy bids from the marketspace module if the bid object is associated with the seller.

23. A system as defined in claim 1 wherein said transaction data comprises phase data, complexity data, sequencing data, allowance data, transparency data, and transaction value data, wherein the pre-processor module is further configured to create a bid object including the transaction data, and to transmit the bid object to the marketspace module, and wherein the execution engine is configured to retrieve the bid object from the marketspace module, and to model a market structure corresponding with the market transaction by executing the steps of:
identifying the complexity data as either 1×N, N×1, or N×N;
identifying the phase data as either continuous or discrete;
identifying the sequencing data as either ascending, descending or random;
identifying the allowance data as either single or multiple;
identifying the transparency data as either open or closed; and
identifying the transaction value data as either bidder or clearing.

24. A system as defined in claim 23 wherein the pre-processor is further configured to validate the transaction data.

25. A system as defined in claim 23 wherein the execution engine is further configured to determine whether the bid object is associated with a buyer or a seller.

26. A system as defined in claim 25 wherein the execution engine is further configured to transmit the bid object to the marketspace module and to retrieve a new bid object from the marketspace module if the bid object is associated with a buyer and the complexity data is N×1.

27. A system as defined in claim 25 wherein the execution engine is further configured to transmit the bid object to the marketspace module and to retrieve a new bid object from the marketspace module if the bid object is associated with a seller and the complexity data is 1×N.

28. A system as defined in claim 25 wherein the execution engine is further configured to execute the steps of:
reading in all associated sell bids from the marketspace module if the bid object is associated with a buyer; and
reading in all associated buy bids from the marketspace module if the bid object is associated with a seller.

* * * * *